July 19, 1955
C. BRETSCHNEIDER
2,713,497
STEERING MECHANISM FOR MOTOR VEHICLES
Filed Feb. 14, 1951
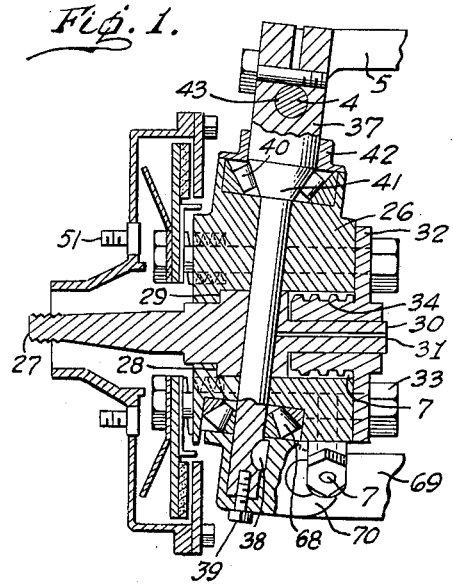
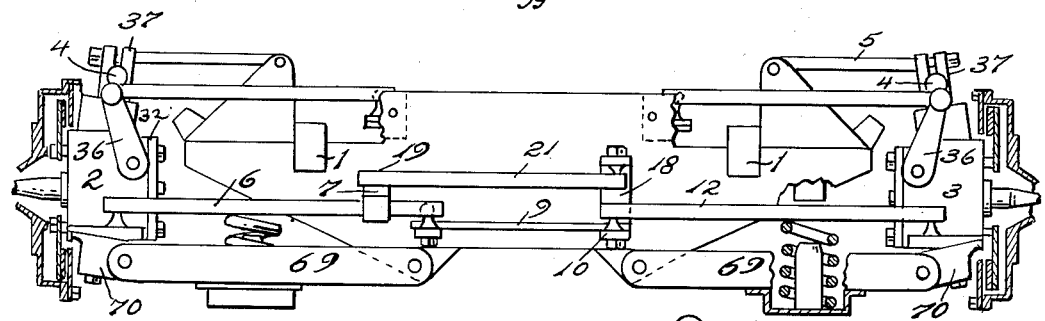
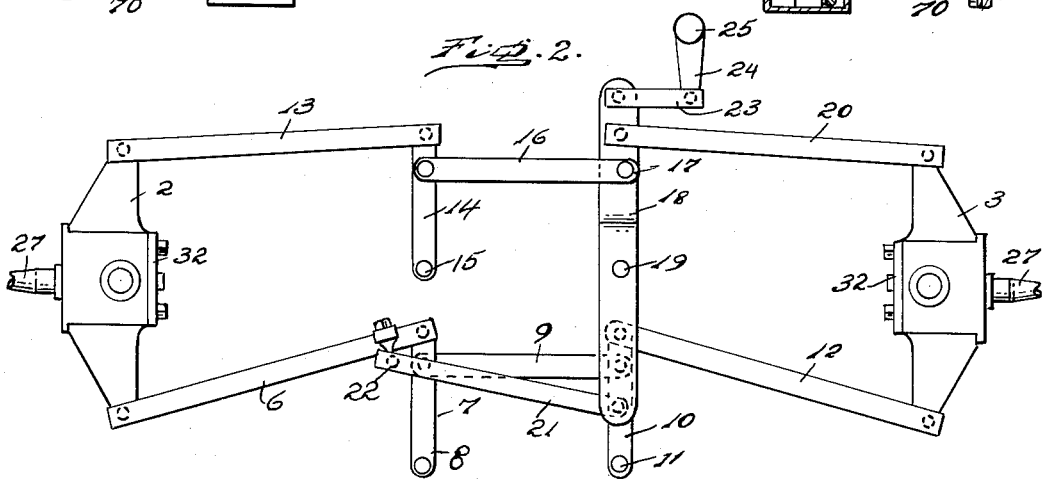
INVENTOR.
Curt Bretschneider
BY Herbert S. Fairbanks
Attorney

United States Patent Office 2,713,497
Patented July 19, 1955

2,713,497
STEERING MECHANISM FOR MOTOR VEHICLES

Curt Bretschneider, Philadelphia, Pa.

Application February 14, 1951, Serial No. 210,843

6 Claims. (Cl. 280—95)

One object of this invention is to devise novel steering mechanism for motor vehicles which instead of exerting a pull on one wheel at one side of the motor vehicle and a thrust on the wheel at the opposite side will exert a pull in either direction of turning of the wheels, thereby minimizing shimmy and providing a hair-line steering of the front wheels.

If the front wheels are turned thirty degrees in one direction, for example to the left, the right wheel turns only twenty seven degrees because it travels in a larger circle, and auxiliary tie rods and their connections cooperate in harmony with such turning.

A further object of the invention is to devise a novel steering knuckle comprising a steel casting into which the wheel spindle is forced under pressure.

With the foregoing objects in view and other objects of construction and advantage, my invention comprehends novel steering mechanism for motor vehicles.

For the purpose of illustrating the invention, I have shown in the accompanying drawings a preferred embodiment of it which, in practice, will give satisfactory and reliable results. It is, however, to be understood that the various instrumentalities of which the invention consists can be variously arranged and organized and the invention is not limited to the exact arrangement and organization of these instrumentalities as herein set forth except by the scope of the appended claims.

Figure 1 is a vertical section through a steering knuckle and also shows certain features of a braking mechanism.

Figure 2 is a front elevation, partly in section and partly broken away of steering mechanism embodying my invention.

Figure 3 is a schematic view of the steering mechanism showing the leverage system for actuating the steering knuckles.

The steering mechanism

As seen in Figure 2, I provide a frame 1 which carries steering knuckles 2 and 3 of novel construction, the steering knuckles having trunnions 4 mounted in frame members 5. A link 6 is pivotally connected at one of its ends to the side of the steering knuckle 2 and at its opposite end to the inner end of a link 7 pivotally connected at 8 to the frame. A cross link 9 connects the inner portion of the link 7 to the inner end of a link 10 pivoted to the frame at 11. A link 12 pivotally connects the inner end of the link 10 with a side of the steering knuckle 3.

In a similar manner to that just described, the opposite sides of the steering knuckles are connected by a link and leverage system. A link 13 pivotally connects the opposite side of the steering knuckle 2 with a link 14 pivotally mounted on the frame at 15 and connected by a link 16 with a lever 18 fulcrumed at 19. A link 20 connects the lever 18 with the steering knuckle 3. The lever 18 is pivotally connected by a link 21 with the link 6 at 22. The lever 18 may be connected by link 23 with the pitman 24 connected with the steering post 25 or the steering post may be connected with the lever 18 at the pivot portion 19 to operate the linkage and lever systems between the steering knuckles.

The steering knuckles

Referring now more particularly to Figure 1, the steering knuckles are each of the same construction, having a body portion 26 having a hole therethrough of differential diameters to receive a spindle 27 having a shoulder 28 to contact a shoulder 29 of the body portion to limit outward movement of the spindle in the body portion. The spindle has a stem of reduced diameter as at 30 having a lubricating passage 31 and extending through a closure 32.

The closure 32 is mounted on bolts 33 passing loosely through the body portion and has a hub provided with a worm 34 surrounding the stem 30. The worm meshes with a worm gear rotatably mounted in the body portion and provided with an arm 36 for actuating it and forming part of braking mechanism which is not claimed in this application.

The body portion and spindle are apertured to receive a king pin 37 keyed at 38 to a cap 70 to which one end of the lower action arm 69 is pivoted. A threaded stud may be employed to position the king pin as shown at 39. The body portion is chambered to receive roller bearings 40, the upper one of which cooperates with a tapered bearing on the king pin as shown at 41 and the chamber of the upper roller bearing is closed by a cap 42. The lower roller bearing is retained in place by the cap 70. The king pins are split to provide openings 43 to receive pins 4 of the upper action arms 5.

The steering knuckles have disc brakes combined with them.

Operation of the steering mechanism

The steering post of the motor vehicle may be connected to any desired point in the leverage system. For example, it may be connected to the pitman arm 24 linked to the lever 18 or to the lever 18 in any desired manner. Due to the provision of a double set of links such as 6 and 13, and 12 and 20 and their connections there is always a pull on a steering knuckle during its turning movement irrespective of the direction of turning. This overcomes any tendency of the linkage to buckle and minimizes shimmy. The steering knuckle is a steel casting and the spindle is forced into it under pressure. By extending the king pin above the knuckle to receive the short action arm and at the bottom to receive the long action arm, the leverage is increased from the customary two and one-half inches to eight inches, and the steering knuckle support is eliminated. The provision of auxiliary tie rods with the pendulum levers and the increased leverage of the king pins enables one to obtain hair-line steering, longer life and elimination of shimmy and buckle.

Having thus described my invention, what I claim as new and desire to secure by Letters Patent is:

1. A steering knuckle for motor vehicles, comprising a body portion having a laterally extending opening therethrough, a spindle fixed in said opening, a king pin passing through said body portion and spindle, said king pin extending above the body portion to receive a short action arm and extending below the body portion to receive a long action arm, anti-friction bearings for said king pin adjacent each end thereof mounted on the top and bottom of the body portion.

2. The construction defined in claim 1, wherein means are connected to opposite sides of the body portion to turn it in a selected direction, said means including links at an acute angle to each other arranged in pairs connected to opposite sides of said body portion.

3. A steering knuckle for front wheel suspension of the knee action type, comprising a steering knuckle support having an axle receiving opening, an axle insertable in said opening said support and axle having inclined registering openings for reception of a king pin.

4. The construction defined in claim 3, wherein said registering openings are in a plane at less than a right angle to the longitudinal axis of the axle receiving opening.

5. A steering mechanism for motor vehicles, comprising steering knuckles, pairs of front and rear links having their outer ends pivotally connected to opposite sides of the steering knuckles, the front links of each pair being arranged at an acute angle to the rear link of its pair, the inner ends of the front links and of the rear links being linked together, a pair of links at an angle with the front links, having fixed pivots at one end, at their opposite ends pivotally connected with the front links, a link having a fixed pivot at one end and pivotally connected at its opposite end with the inner end of a rear link, a lever having a fixed pivot, linked at one side of its pivot to the fixed pivot link connected with a rear link and at the opposite side of the lever pivot to a front link, and actuating means for said lever.

6. A steering mechanism for motor vehicles comprising steering knuckles for the front wheels of the vehicles, pairs of front and rear links having the outer ends of each pair pivotally connected to opposite sides of the steering knuckles, the front link of each pair being arranged at an acute angle with the rear link of its pair, a pair of links pivotally linked together, having a fixed pivot at one end and pivotally connected at their other end to the inner ends of the front links, a single link having a fixed pivot at one end and its other end pivotally connected to one of the rear links, a lever, having a fixed pivot, linked to said single link at one side of the fixed pivot and pivotally connected with the inner end of a rear link, said lever at the opposite side of the pivot being linked to one of the front links near the inner end of such front link, and actuating means for said lever, and the acute angle of said front links contributing to cause, during the turning movement of the front wheels, the inner steering knuckle to have a greater degree of turning movement than the outer steering knuckle.

References Cited in the file of this patent

UNITED STATES PATENTS

| | | |
|---|---|---|
| 880,202 | Dingman | Feb. 25, 1908 |
| 968,627 | Young | Aug. 30, 1910 |
| 1,152,455 | Vaughn | Sept. 7, 1915 |
| 1,568,782 | Swayne | Jan. 5, 1926 |
| 1,959,548 | Rier | May 22, 1934 |
| 1,968,022 | Bijur | July 31, 1934 |
| 2,042,624 | Pearson | June 2, 1936 |
| 2,109,722 | Fawick | Mar. 1, 1938 |
| 2,111,111 | Dickey | Mar. 15, 1938 |
| 2,153,862 | Cowles | Apr. 11, 1939 |
| 2,334,702 | Newton et al. | Nov. 23, 1943 |
| 2,356,258 | Martin | Aug. 22, 1944 |